UNITED STATES PATENT OFFICE.

L. HENRY FRED. MELSENS, OF LORAIN, BELGIUM, ASSIGNOR TO LOUIS DE SAULLES, OF NEW ORLEANS, LOUISIANA.

COMPOSITION FOR THE MANUFACTURE OF SUGAR.

Specification forming part of Letters Patent No. 7,057, dated January 29, 1850.

*To all whom it may concern:*

Be it known that I, L. H. F. MELSENS, of Lorain, in Belgium, have invented certain new and useful Improvements in the Manufacture of Sugar from Cane and other Saccharine Juices; and I do hereby declare that the following is a full, clear, and exact description of the principle or character which distinguishes them from all other things before known and of the usual manner of making, modifying, and using the same.

The invention consists in a process for the extraction of the crystallizable sugar contained in the sugar-cane, in the beet-root, in the Indian corn, &c., by which it can be obtained without loss by either cold or hot or by slow or by rapid evaporation at will.

The properties of sulphurous acid have already been verified in relation to the "mutisme" of wines and of liquors containing the sugar of the grape. By mutisme I mean that condition in fermentable compounds induced by foreign bodies by which the fermentation is checked, delayed, or prevented. The foreign body used becomes, under the conditions which I explain below, an agent for the complete extraction of the crystallizable sugar contained in the juice of different plants; but much as its employment has been extolled on various occasions nevertheless all experiments made with it on a large scale for the purpose of extracting the sugar from the sugar-cane or from the beet-root have proved abortive, in consequence, no doubt, of the great chemical change which the crystallizable sugar undergoes by the influence of secondary products. The sulphites have been employed for the same purpose; but their application has furnished no practical solution of the problem. I have attained two results very advantageous and uniform by the employment of the sulphite of lime dissolved in sulphurous acid, or, generally, by the employment of an acid sulphite of lime. The bisulphite is the combination that I prefer. The employment of this agent resists completely the change of the crystallizable sugar pre-existing in the vegetable liquor, and admits of the extraction by slow or rapid evaporation, in the air or *in vacuo*, of nearly the entire sugar in the form of crystals. This process renders the use of other defecators, either acid or alkalies, unnecessary. It renders useless, or nearly useless, animal-black in the fabrication of sugar. In order that the method should succeed, it is necessary that the reagent indicated be intimately mixed with the pulp or with the juice so soon as the crushed vegetable-cells are exposed to the air. In this manner neither change nor coloration is possible. Fermentation arising from the decomposition of azotized matters cannot happen. The formation of ammoniacal salts is thus directly avoided. The liquid proceeding from the pressed pulp is submitted to evaporation the same as it would be in concentrating any saline solution unchangeable by the action of the air. When the liquid procured from the pressed pulp or from the crushing-mill has been during some moments warmed up to 100° centigrade it should be left in repose, so as to draw off the limpid portion; or it can be filtered through pocket-filters. The filtrated liquid is then evaporated either spontaneously cold or in vessels heated by plunging into boiling water, or heated by steam, or heated by the naked fire, or in any other way *in vacuo*, or in air, to about 30° Baumé. After another filtration, the whole of this sirup, left to itself in a place a little warm, crystallizes entirely. The sugar is thus obtained integrally, no coloring-matter arising in the evaporation. I have never observed that it was absolutely necessary to introduce additional bases or salts to complete the defecation created by the bisulphite of lime, the proper employment of it and simple filtration have sufficed to obtain all the sugar at the first trial. The employment, however, of powdered animal-black and of albuminous liquors to clarify the sirup when about 30° Baumé improves the quality and the flavor of the sugar. When I make use of bases—such as lime, magnesia, &c.—it is always upon sirup already at 25° to 30° Baumé that I operate, and then it is entirely for the purpose of removing any taste of sulphurous acid and to obtain a better clarification by the use of albuminous matters. These may be used to advantage, but all excess must be avoided.

I have investigated to ascertain if chalk or other carbonates that favored the formation of deposits added to the liquid in evaporation would take away the taste. Ordinarily their introduction has appeared to me useless.

The bisulphite of lime employed at the moment when the vegetable-cells come in contact with the air resists the action of the air upon the azotized matters, which it renders incapable of becoming ferments. The presence of the base or of the neutral salt prevents the sulphurous acid transforming itself into a free sulphuric that would destroy the sugar. The sulphuric acid which would be produced would form immediately the sulphate of lime—a salt not only inoffensive but useful. The effect of the heat upon the juice treated with the soluble bisulphite transforms a portion of this into neutral sulphite, which precipitates itself, coagulates the albuminous matters, and draws them down with it. The quantity of sulphite required to treat the beet-root is very small. It is enough to employ two per cent. in weight, of the beet-root of a solution of bisulphite making 10° Baumé. An excess beyond this is not pernicious. I have been able with impunity to employ it to the extent of ten per cent. for the sugar-cane. One per cent. suffices, and very probably in working upon a large scale these proportions may be diminished. The employment of the bisulphite is directly applicable to those cases where, instead of operating by pressure, levigation or maceration is used, and by either of these modes of working all the sugar can be secured, no matter what quantity of water may be employed. Not only does the use of the bisulphite of lime enable me to obtain without any chemical change the sugar that is in the cane or in the beet-root, but I have generalized its employment for the fabrication of all vegetable extracts, for anatomical preparations, vegetable or animal, for the preservation of animal matters, for their disinfection, in a word, for all the cases where it is important to arrest fermentation without introducing any dangerous or energetic chemical agent. Other sulphites may operate in the same manner—such as the sulphites of baryta, strontia, &c.—there are even some neutral salts that the sulphurous acid has the property of dissolving, as the phosphate of lime, &c., provided that their liberated acid does not act upon the sugar. Thus gelatine may be fabricated in preparing a defecator and leave residuums very rich and useful as manures.

The preparation of the sulphite is very simple. It suffices to burn some sulphur or pyrites and to send the products of the combustion freed from impurity by making them pass through dry chambers (*des chambres seches*)—as, for example, chambers filled with old stoneware, &c., into the conduits of the dry chamber in which is made to flow from an opposite direction a shower of milk, of lime, or pure water, which dissolves the sulphurous acid.

That which I claim as my invention, and that which I desire to have secured to me by Letters Patent, is—

The mutisme or process of treating saccharine solutions by means of a solution of acid, sulphite of lime, baryta, or strontia, as hereinbefore described, applied to products containing sugar from the cane or other vegetables, that the crystallizable sugar may undergo no chemical change, either by the formation of secondary products, which destroy it, or by the generation of ferments, which modify or transform it.

Paris, August 3, 1849.

MELSENS.

Witnesses:
 J. WOREAN,
 J. VINCENT.